United States Patent
Schmidt

(10) Patent No.: US 7,260,104 B2
(45) Date of Patent: Aug. 21, 2007

(54) DEFERRED QUEUING IN A BUFFERED SWITCH

(75) Inventor: Steven G. Schmidt, West Hampton, NJ (US)

(73) Assignee: Computer Network Technology Corporation, Minneapolis, MN (US)

(*) Notice: Subject to any disclaimer, the term of this patent is extended or adjusted under 35 U.S.C. 154(b) by 763 days.

(21) Appl. No.: 10/020,968

(22) Filed: Dec. 19, 2001

(65) Prior Publication Data

US 2003/0112818 A1 Jun. 19, 2003

(51) Int. Cl.
*H04L 12/56* (2006.01)
(52) U.S. Cl. ............... 370/414; 370/416; 370/395.7
(58) Field of Classification Search ........ 370/412–418, 370/395.7–395.72
See application file for complete search history.

(56) References Cited

U.S. PATENT DOCUMENTS

| | | | | |
|---|---|---|---|---|
| 5,455,820 A * | 10/1995 | Yamada | ................ | 370/395.71 |
| 5,619,495 A * | 4/1997 | Yamanaka et al. | .......... | 370/413 |
| 5,978,359 A * | 11/1999 | Caldara et al. | ............. | 370/236 |
| 6,078,959 A | 6/2000 | Wright et al. | ................ | 709/227 |
| 6,091,707 A | 7/2000 | Egbert et al. | | |
| 6,442,172 B1 * | 8/2002 | Wallner et al. | ............. | 370/416 |
| 6,904,043 B1 * | 6/2005 | Merchant et al. | ........... | 370/402 |
| 6,993,027 B1 * | 1/2006 | Kadambi et al. | ........... | 370/394 |

OTHER PUBLICATIONS

Gregory L. Frazier & Yuval Tamir, The Design and Implementation of a Multi-Queue Buffer for VLSI Communication Switches, 1989 IEEE.

Kohei Shiomoto, Masayuki Murata, Yuji Oie & Mideo Miyahara, Performance Evaluation of Cell Bypass Queuing Discipline for Buffered Banyan Type ATM Switches, 1990 IEEE.

* cited by examiner

*Primary Examiner*—Kwang Bin Yao
*Assistant Examiner*—Habte Mered
(74) *Attorney, Agent, or Firm*—Beck + Tysver, P.L.L.C.

(57) ABSTRACT

A method and apparatus for temporarily deferring transmission of packets/frames to a destination port in a buffered switch is disclosed. When a request for transmission of at least one packet/frame to the destination port is received, it is determined whether the destination port is available to receive the at least one packet/frame. The transmission of the at least one packet/frame is deferred when the destination port is not available to receive the at least one packet/frame. The packet/frame identifier and memory location for each deferred packet/frame is stored in a deferred queue and the process then repeats for the next packet/frame. Periodically, the apparatus attempts to transmit the packets/frames in the deferred queue to their respective destination ports.

27 Claims, 8 Drawing Sheets

DEFERRED QUEUING IN A BUFFERED SWITCH

FIELD OF THE INVENTION

The present invention relates generally to buffered switches. More particularly, the present invention relates to deferred queuing in a buffered switch to alleviate head of line blocking in the buffered switch.

BACKGROUND OF THE INVENTION

Communication switches are often used in information networks to transfer information between devices within the network. These switches can have as few as 4 ports or as many as thousands of ports. Each input port generally requires some amount of buffer space to store frames or packets of information prior to the frames or packets being forwarded to an output port.

One problem associated with buffered switches is head of line blocking. Head of line blocking occurs in switches that have a single receive buffer at each ingress port. When multiple packets or frames of data are queued up (in line) for transmission through a central switch and the destination of the packets or frame at the front of the queue (head of line) is not available for reception, the queue is defined as "head of line blocked". This is because, not only is that packet or frame blocked, all packets or frames behind the blocked packet or frame in the queue are blocked even though their destination may be available. Thus, all packets or frames are blocked until the packet or frame at the head of the queue is transmitted.

One way to solve head of line blocking is to provide one receive buffer at each of the switch's ingress ports for every egress port. For small switches, this approach may be feasible. However for very large switches, massive amounts of memory must be used to provide buffering for all of the outputs. If the switch requires a large input buffer due to long haul applications, the problem is exacerbated further. Accordingly, it is desirable to provide a method and apparatus for alleviating the problems associated with head of line blocking in a buffered switch without using separate buffers for every output.

SUMMARY OF TEE INVENTION

The present invention overcomes the problems cited above by temporarily ignoring the blocked packet/frame and deferring its transmission until the destination is ready for reception. This approach does not require any additional memory for frame storage but does require a small amount of memory for frame headers In one aspect of the present invention, a buffer control apparatus in a buffered switch for controlling transmission of packets/frames of data is provided. The buffer control apparatus comprises a dual port memory buffer, a buffer write module, a buffer read module and a deferred queue device. The dual port buffer memory stores the packets/frames of data. The buffer write module writes packet/frames into the dual port buffer memory. The buffer read module reads packet/frames of data from the dual port buffer memory. The deferred queue device controls the read module so as to temporarily defer transmission of the packets/frames to a destination port which is not available to receive the packets/frames. The deferred packets/frames are queued for later transmission.

In accordance with another aspect of the present invention, a deferred queue device for temporarily deferring transmission of packets/frames to a destination port in a buffered switch is provided. A deferred header queue device stores frame headers and buffer locations for packets/frames being deferred. Determination means determine current status of all destination ports in the buffered switch. A header select logic unit determines the state of the deferred queue device and supplies a valid buffer address for a deferred packet/frame which can now be sent to the destination port.

According to another aspect of the present invention, a method temporarily deferring transmission of packets/frames to a destination port in a buffered switch is disclosed. When a request for transmission of at least one packet/frame to the destination port is received, it is determined whether the destination port is available to receive the at least one packet/frame. The transmission of the at least one packet/frame is deferred when the destination port is not available to receive the at least one packet/frame. The packet/frame identifier and memory location for each deferred packet/frame is stored in a deferred queue and the process then repeats for the next packet/frame. Periodically, the apparatus attempts to transmit the packets/frames in the deferred queue to their respective destination ports.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENT OF THE INVENTION

A preferred embodiment of the present invention provides a deferred queue device in a buffered switch which temporarily ignores blocked packets/frames and defers transmission of these blocked packets/frames until the destination port is ready for reception, thereby alleviating head of line blocking in a buffered switch.

Figure 1:
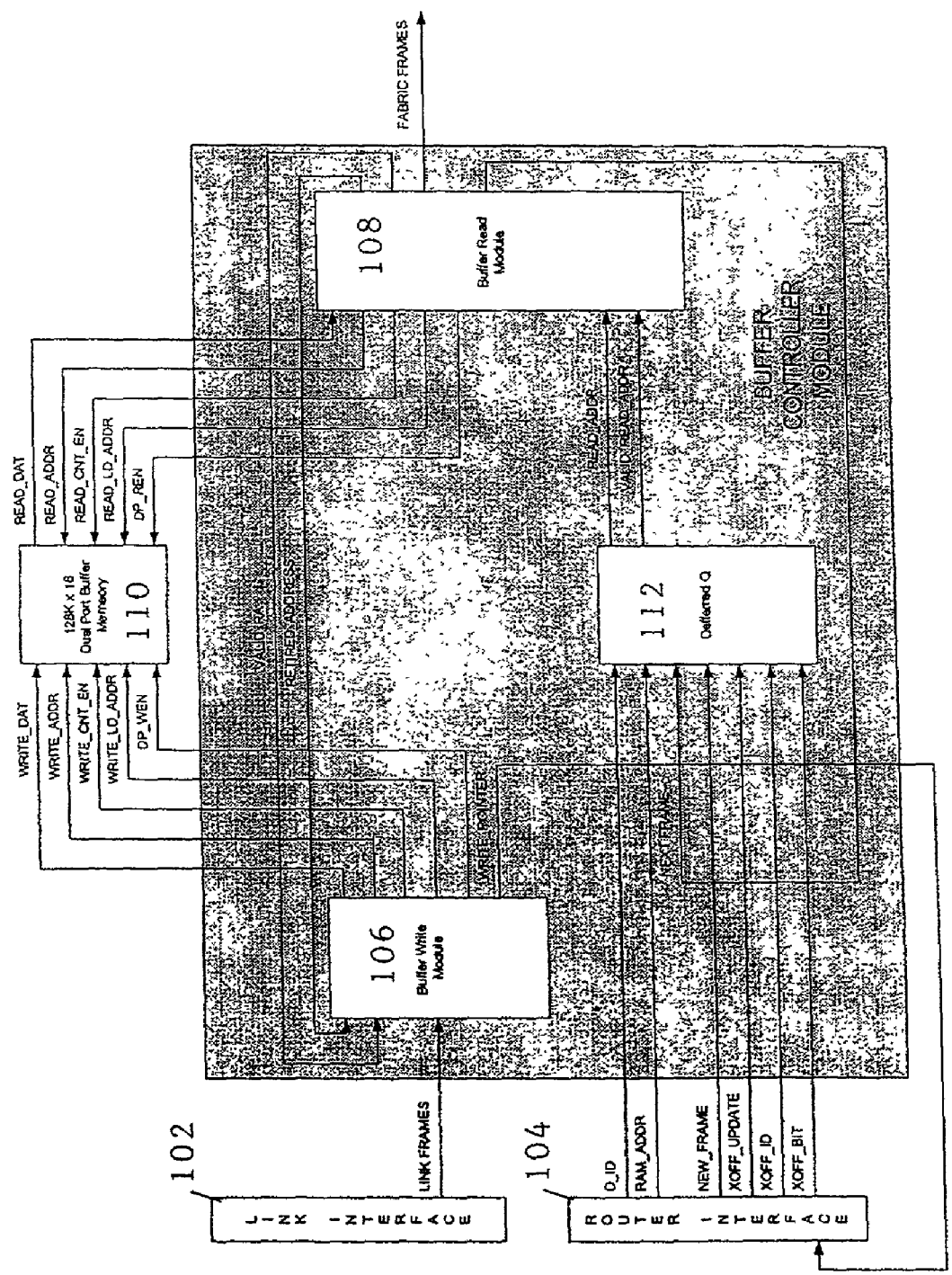
FIG. 1 is a block diagram illustrating a buffer controller of a preferred embodiment of the present invention.

A preferred embodiment of the present inventive apparatus and method is illustrated in FIG. 1. FIG. 1 illustrates a buffer controller module 100 which can be used to control transmission of frames or packets of data. The buffer controller module 100 comprises a link interface 102, a router interface 104, a buffer write module 106, a buffer read module 108 and a dual port buffer memory 110. The operations of these elements are well known and will not be described herein. The buffer controller module 100 also comprises a deferred queue device 112. The deferred queue device 112 is used to alleviate head of line blocking in the buffered switch.

The buffered queue device 112 can be used with communication protocols that use packet or frame formats that include a start of frame/packet (SOF) delimiter, a header, a payload, and an end of frame/packet (EOF) delimiter. The frame header has a port egress or destination identifier (D_ID) embedded in the frame or packet header. For the exemplary description below, the deferred queue device 112 is described for a 200 port switch with ingress buffer capacity of 100 variable length frames. It will be understood by those skilled in the art that the deferred queue device can be used in switches with any number of ports with any size-input buffer. In addition, the deferred queue device could also be used in switches that do not use EOF delimiters if the frames/packets are of a fixed length. In the discussion below, only data frames are mentioned. However, it will be understood by those skilled in the art that the description also applies to packets of data and the like.

Figure 2:
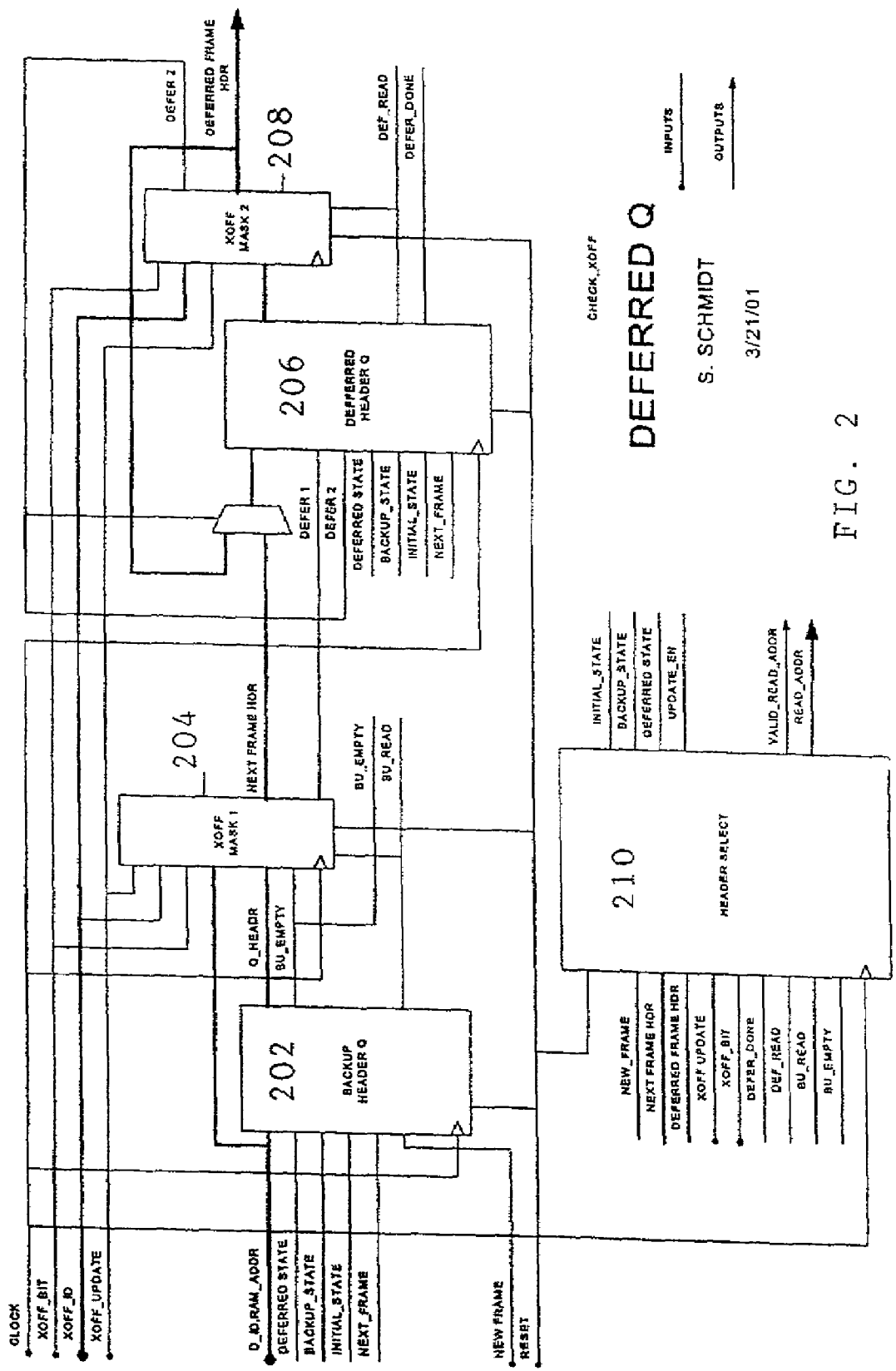
FIG. 2 is a block diagram illustrating a deferred queue device of a preferred embodiment of the present invention.

As illustrated in FIG. 2, the deferred queue device 112 is comprised of five major components: a backup header queue device 202; XOFF masks 204 and 208; a deferred header queue device 206; and the header select unit 210. The deferred header queue 206 stores the frame headers and buffer location for frames waiting to be sent to a destination port that is currently busy. The backup header queue device 202 stores the frame headers and buffer location for frames waiting to be sent to a destination because those frames arrived at the port ingress while deferred frames were being sent to their destination. The XOFF masks 204 and 208 contain the current status of each egress port within the switch. If an XOFF mask bit is set, the egress port corresponding to that bit position in the mask is busy and cannot receive any frames. The header select logic 210 determines the state of the deferred queue device and supplies a valid ingress buffer address containing the next frame to be sent to its egress (destination).

Figure 3:
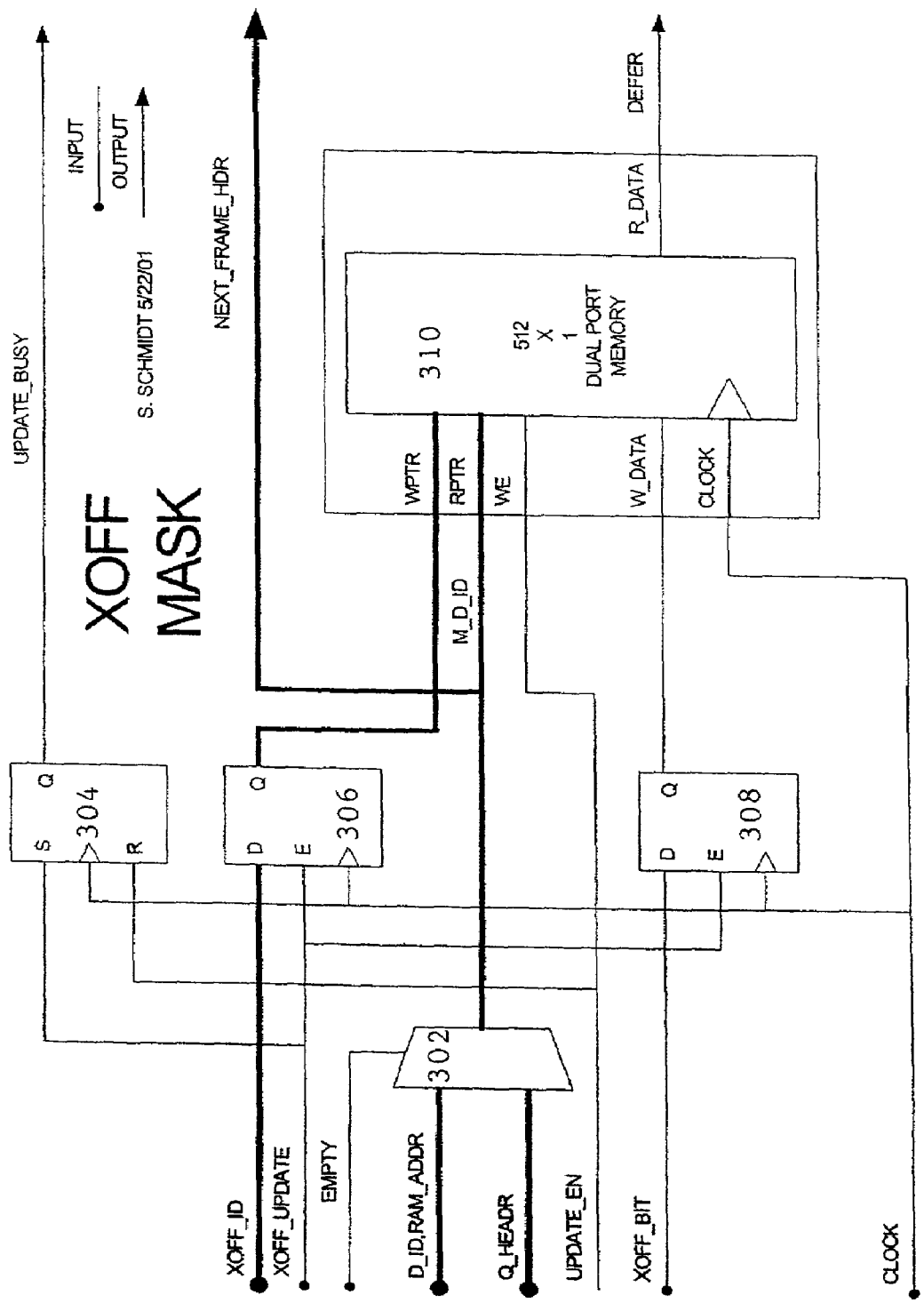
FIG. 3 is a block diagram illustrating an XOFF mask of the deferred queue device of a preferred embodiment of the present invention.

An XOFF mask is illustrated in FIG. 3. The XOFF mask 204 is comprised of a multiplexer 302, flip-flop units 304, 306, 308, and a dual port memory 310. The XOFF masks are used to determine if a frame can be sent to its destination. Determination of a destination's busy state could be indicated by an unsolicited busy signal (XOFF) or a failed connection request. If a destination (egress) port is busy, the port sends an XOFF status signal to all input ports indicating that the port cannot accept any new frames. A 512 by 1 dual port memory 310 is used to store the "XOFF" status of each destination. If a bit is set in a location, its corresponding destination port is busy and cannot accept any new frames.

The XOFF mask's dual port memory 310 is updated by an external XOFF control circuit which is not illustrated. The XOFF control circuit waits for an update_busy indication to be negated and sends an XOFF_ID signal indicating the destination port that is being updated, an XOFF_BIT signal which indicates whether the destination is XOFFing or XONing, and an XOFF_update strobe signal. The XOFF_bit and the XOFF_ID are temporarily stored until the header queue state machine within the header select logic enables the dual port memory 310 to be updated.

In XOFF mask 204, if the backup header is empty, the D_ID field of the current frame is applied to the read pointer (RPTR) of the dual port memory 310. If the backup header is not empty, the D_ID field of the oldest frame header in the backup header queue device 202 is applied to the read pointer on the dual port memory 310. In either case, if the content of the location corresponding to the D_ID is 1, indicating that the desired destination is not available, a defer1 signal is asserted.

XOFF mask 208 is similar to XOFF mask 204 except the XOFF mask 208 does not have the input multiplexer 302. The D_ID field of the DQ_header is applied directly to the dual port memory's read pointer input. If the content of the location corresponding to the D_ID is 1, a defer2 signal is asserted.

Figure 4:
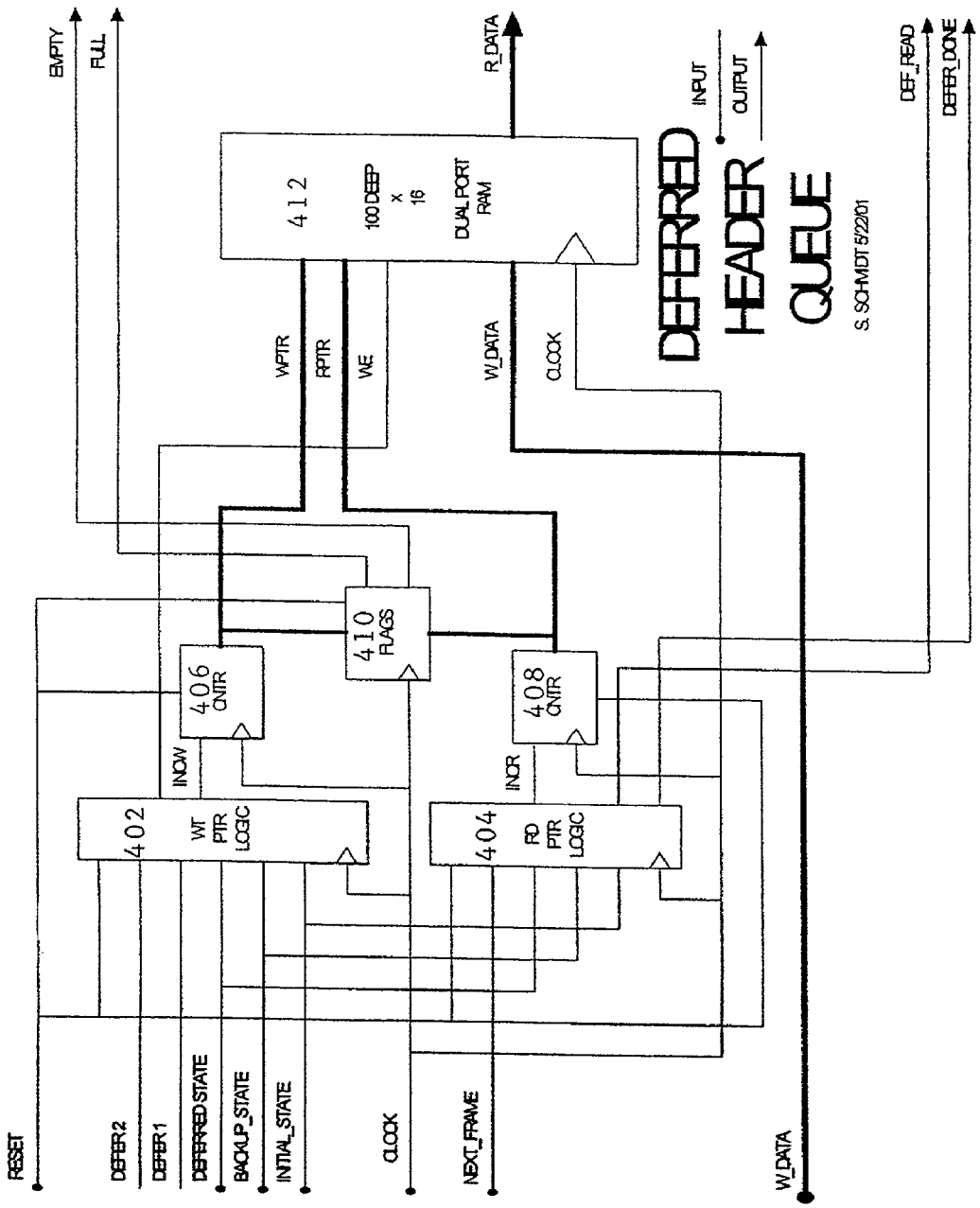
FIG. 4 is a block diagram illustrating a deferred header queue device of the deferred queue device of a preferred embodiment of the present invention.

As illustrated in FIG. 4, the deferred header queue device 206 is comprised of a dual port memory 412, a flag register 410, a write pointer logic unit 402 and an associated counter 406, and a read pointer logic unit 404 and an associated counter 408. In this illustrative embodiment, the dual port memory is a 100 by 16 dual port RAM, but the present invention is not limited thereto. The dual port memory 412 stores header information and an address pointer that indicates where a frame is stored in the buffer memory. The write pointer logic unit 402 determines when the dual port memory should be written to based on the state of the deferred queue device as a whole and the defer1 and defer2 signals that originate from the XOFF masks 204 and 208, respectively. The read pointer logic unit 404 determines when the dual port should be read from based on the state of the deferred queue device as a whole and the next_frame signal. The flag register 410 is used for error status.

Figure 5:
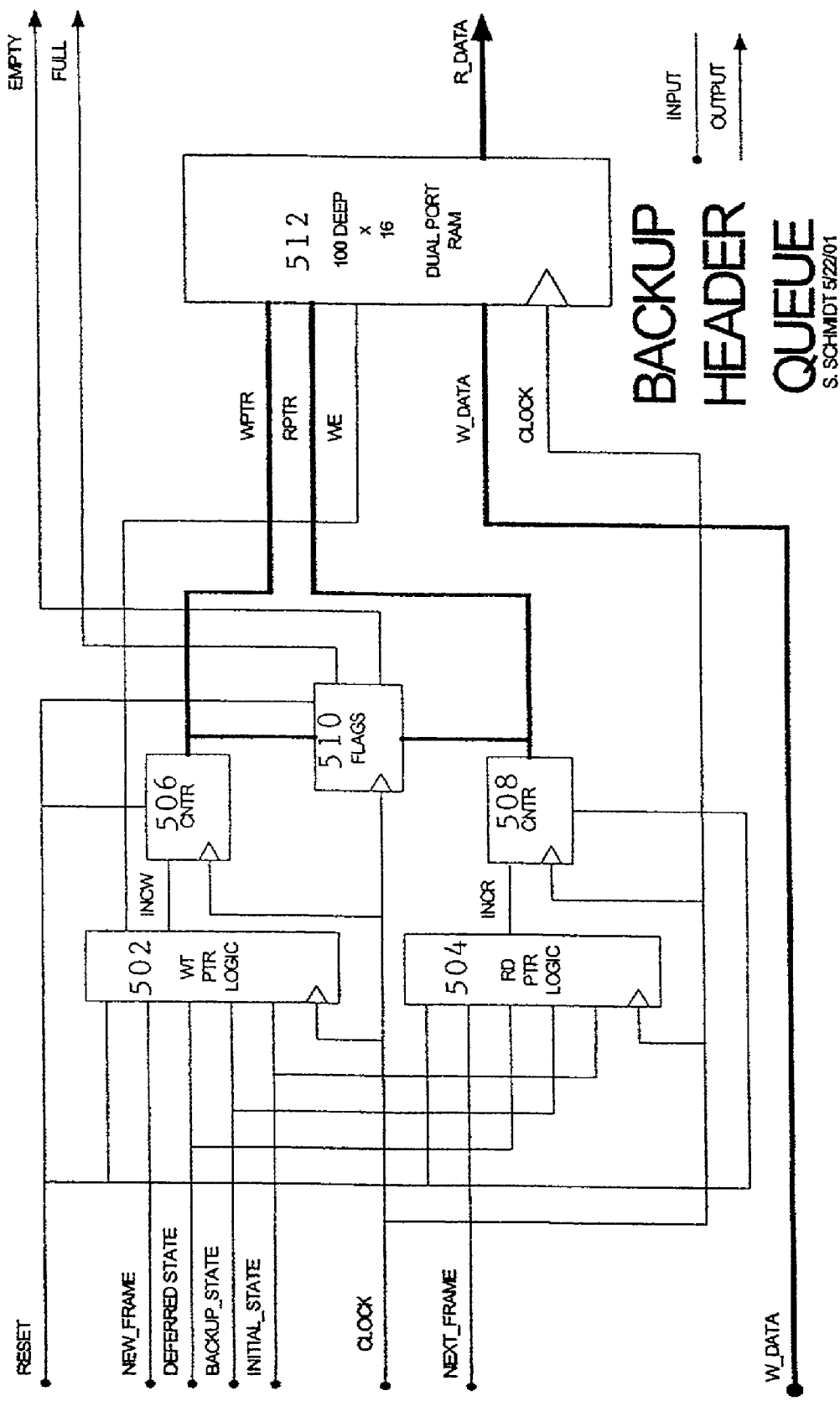
FIG. 5 is a block diagram illustrating a backup header queue device of the deferred queue device of a preferred embodiment of the present invention.

As illustrated in FIG. 5, the backup header queue device 202 is comprised of a dual port memory 512, a flag register 510, a write pointer logic unit 502 and an associated counter 506, and a read pointer logic unit 504 and an associated counter 508. In this illustrative embodiment, the dual port memory is a 100 by 16 dual port RAM, but the invention is not limited thereto. The dual port memory 512 stores header information and an address pointer that indicates where a frame is stored in the buffer memory. The write pointer logic unit 502 determines when the dual port memory should be written to based on the state of the deferred queue device as a whole and the new_frame signal. The read pointer logic unit 504 determines when the dual port should be read from based on the state of the deferred queue device as a whole and the next_frame signal. The flag register 510 is used for error status.

Figure 6:
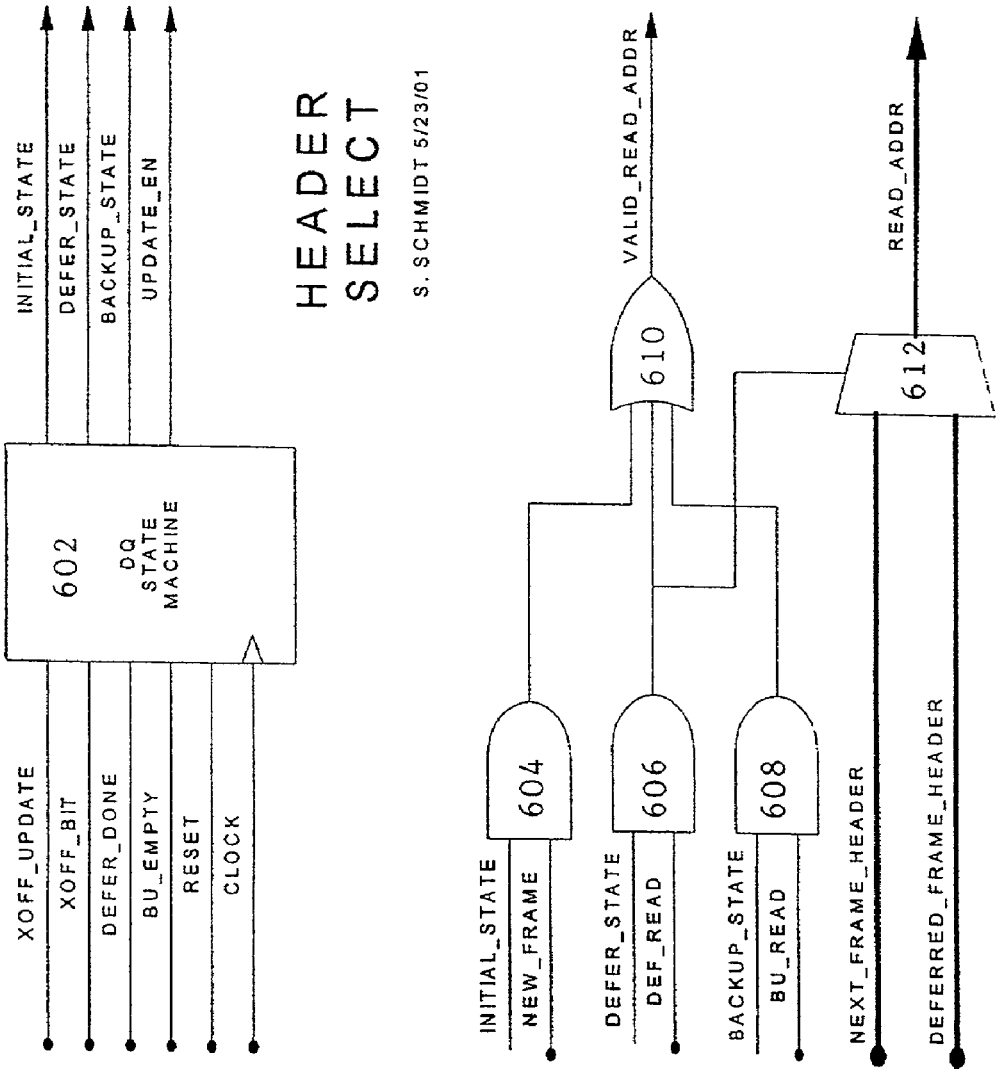
FIG. 6 is a block diagram illustrating a header selection device of the deferred queue device of a preferred embodiment of the invention.

As illustrated in FIG. 6, the header select logic unit 210 contains a deferred queue state machine (DQSM) 602 and logic units 604, 606, 608, 610, and 612 required to select between the next_frame_header signal and the deferred-_frame_header signal for output on the read_addr bus. The header select logic 210 also determines when the contents of the read_addr bus is valid and asserts the valid_read_addr signal.

The DQSM 602 has three states: an Initial State; a Deferred State; and a Backup State. The DQSM enters the Initial State upon reset and stays there until it receives an XOFF_update signal with the XOFF_bit set to a zero (XON). When the XON signal is received, the DQSM 602 moves to the Deferred State until defer_done is asserted. The DQSM 602 then moves to the Initial State or the Backup State depending on the bu_empty signal. If the bu_empty signal is set, the DQSM 602 moves to the Initial State, and if the bu_empty signal is not set, the DQSM 602 moves to the Backup State. If, while in the Backup State, the DQSM 602 detects an XON condition, the DQSM 602 will move to the Deferred State. If an XON condition is not detected while in the Backup State, the DQSM 602 will stay in the Backup State until the bu_empty signal is asserted. At that time, the DQSM 602 will return to the Initial State. The remainder of the header select logic determines when the read_addr output is valid and selects the next_frame_header or the deferred_frame_header for output onto the read_addr bus.

Figure 7:
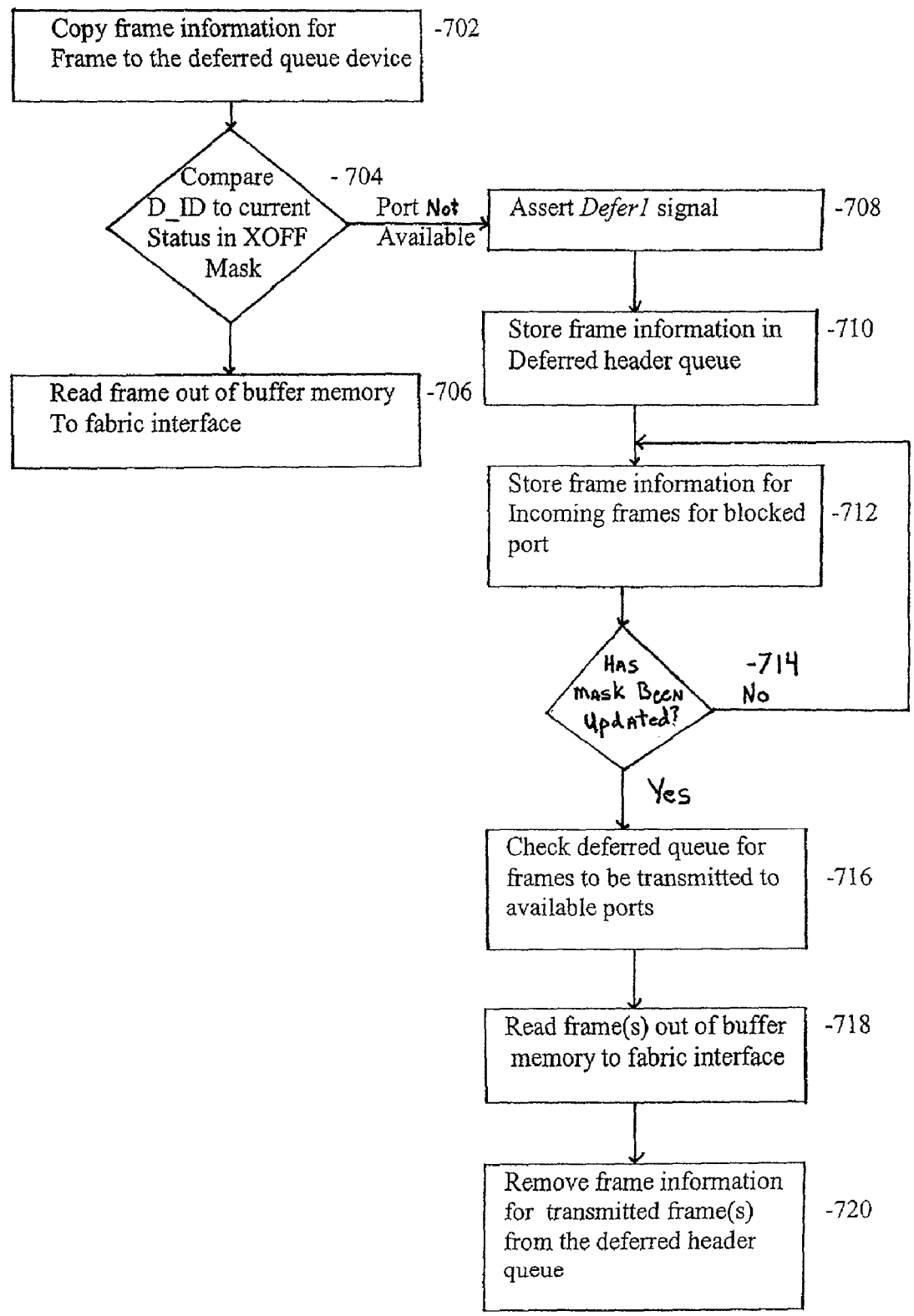
FIG. 7 is a flowchart illustrating the steps of a deferring operation that may be followed in accordance with one embodiment of the present invention.
Figure 8:
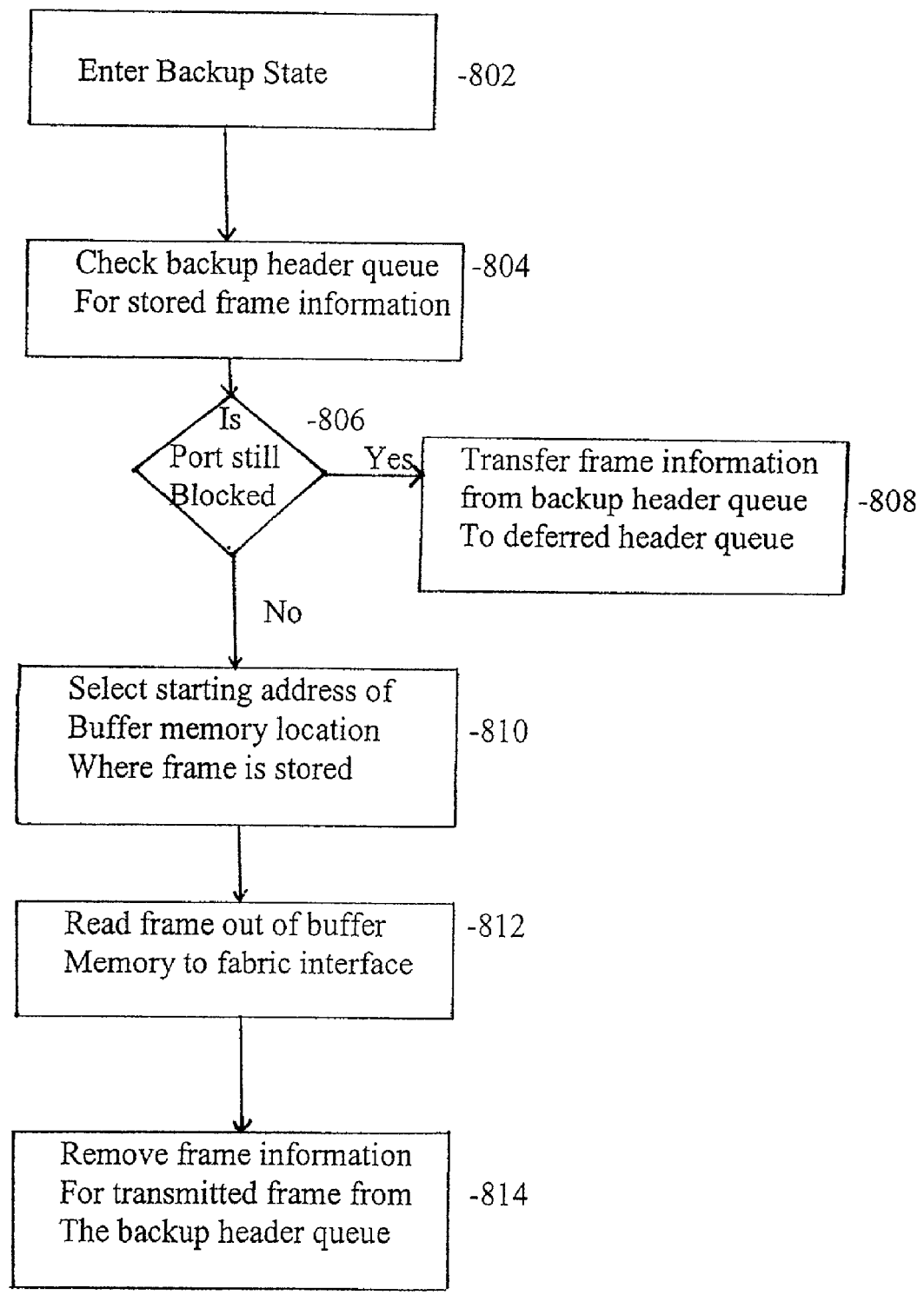
FIG. 8 is a flowchart illustrating the operation of the deferred queue device in the Backup State in accordance with one embodiment of the present invention.

The operation of the deferred queue device 112 will now be described with reference to FIGS. 7–8. To enter the Initial State, the backup header queues are empty or a reset signal be asserted. Only the deferred queue device 112 can be written to while in the Initial State. When a frame enters the buffer memory controller (via a transmission request), frame information such as the frame's D_ID and the starting address of the buffer memory location where the frame is stored are copied, in step 702, to the deferred queue device 112 on its D_ID and RAM_addr bus inputs, respectively. A New_frame signal enables XOFF mask 204 to compare the D_ID to the current status in the XOFF mask 204 in step 704. If the XOFF mask 204 indicates that the port identified by the D_ID is not available, the defer1 signal is asserted in step 708. When the frame is to be deferred (defer1 is active), the D_ID and RAM_addr are stored in the deferred header queue 206 in step 710. If the XOFF mask 204 indicates that the port identified by the $D\_{ID}$ can be transmitted to (defer1 is not asserted), the header select logic puts the contents of next_frame_header on its read addr output and asserts valid_read_addr. The buffer memory controller then reads the frame out of the buffer memory to the fabric interface in step 706.

While in the Deferred State, the header information for all incoming frames for the block port is stored in the backup header queue device 202 in step 712. When the XOFF mask update clears a bit indicating that the port is no longer blocked (XON condition) in step 714, the deferred queue is checked for frames that can now be transmitted to the port in step 716. The header select logic detects the XON condition and asserts a deferred_state signal to the deferred header queue device 206.

While in the Deferred State, the XOFF mask 208 determines if the deferred frame can be transmitted or if it needs to continue to be deferred. When the deferred header queue device 206 asserts a def_read signal, the XOFF mask 208 compares the D_ID field of the DQ_header to the updated status information in the XOFF mask 208. If the XOFF mask 208 indicates that the port identified by the D_ID can be transmitted to, the header select logic passes the starting address of the buffer memory location where the frame is stored from its deferred_frame_hdr input to its read_addr output. At the same time, the header select logic asserts the valid_read_addr signal to the buffer memory controller. The buffer memory controller then reads the frame out of the buffer memory to the fabric interface in step 718. The header information and memory location for the transmitted frame is then removed from the deferred header queue in step 720.

If the XOFF mask 208 determines that the port identified by the D_ID cannot be transmitted to, the header is written back into and at the end of the deferred queue from which the header came. This process is repeated until all entries in all queues are either discarded (frame is sent to its destination) or re-entered (frame continues deferred status). When this operation is complete, all deferred headers that could not be serviced will have been written back into the queue in the same order that they were read out. All headers that are serviced are discarded. This entire operation is considered the header check cycle.

If an XON condition occurs during the header check cycle, the XOFF masks are not updated to reflect the new XON status until the header check cycle finishes. Once the cycle finishes, the cycle is restarted with the new XOFF mask value. Preserving the frame order in the FIFO and allowing XONs to occur only on the boundaries of the header check cycle guarantees in order frame delivery.

If an XOFF condition occurs during the header check cycle, the XOFF masks will be updated immediately and take effect on the next read of the deferred header. If XOFFs are not updated immediately, the entire contents of the buffer could flood a destination that only had room for a single frame.

When all deferred header queues are checked and no new XOFF_updates have occurred, the deferred queue device enters the Backup State in step 802. When in the Backup State, the backup header 202 is checked for frames that may have been stored while the deferred queue was being serviced in step 804. When the backup header queue 202 asserts a bu_read signal, the backup header's q_header output is applied to the XOFF mask 204. The XOFF mask 204 determines if the "backed up" frame can be transmitted or if it must be deferred in step 806. If the frame is to be deferred, the header is transferred from the backup header queue to the deferred header queue in step 808. If the XOFF mask 204 indicates that the port identified by the D_ID can be transmitted to, the header select logic passes the starting address of the buffer memory location where the frame is stored from its next_frame_hdr input to its read_addr output in step 810. At the same time, the header select logic asserts the valid_read_addr signal to the buffer memory controller. The buffer memory controller then reads out the frame out of the buffer memory to the fabric interface in step 812. The header information and memory location for the transmitted frame is then removed from the backup header queue in step 814.

If an XOFF_update indication occurs while the backup header queue is being serviced, the header select logic goes back to the Deferred State and services any frame that may have been deferred. Header processing continues to move back and forth between the Deferred and Backup States until all headers are processed to completion. When all headers are processed, the deferred queue returns to the Initial State.

It will be understood that the different embodiments of the present invention are not limited to the exact order of the above-described steps as the timing of these steps may be interchanged without affecting the overall operation of the present invention. Furthermore, the term "comprising" does not exclude other elements or steps, the terms "a" and "an" do not exclude a plurality and a single processor or other device may fulfill the functions of several of the units or circuits recited in the claims.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A buffer control apparatus in a buffered switch for controlling transmission of data, comprising:
   a buffer memory for storing the data;
   a buffer write module for writing the data into the buffer memory;
   a buffer read module for reading the data from the buffer memory;
   a deferred header queue containing entries having destination and buffer address information for data to be deferred, with entries for data addressed to multiple destinations ports being intermingled within the deferred header queue;
   a header select device for controlling the buffer read module and having an initial and a deferred state,
      the initial state adding entries to the deferred queue so as to temporarily defer transmission to a destination port unavailable to receive the data, and
      the deferred state processing all entries in the deferred header queue in the order in which the entries were written in the deferred header queue, the deferred state submitting the buffer address information for an entry to the buffer read module when the destination port is available to receive data or the deferred state keeping the buffer address information on the deferred header queue when the destination port is unavailable to receive data.

2. The buffer control apparatus according to claim 1, wherein the header select device further has a backup state wherein data received during the deferred state is analyzed for transmission or deferral after the deferred state has reviewed all entries in the deferred header queue.

3. The buffer control apparatus according to claim 2, further comprising:
   a backup header queue containing entries for data that is received during the deferred state.

4. The buffer control apparatus according to claim 1, wherein an XOFF mask is used to determine the current status of all destination ports in the buffered switch, the XOFF mask being a memory device having a bit associated with each possible destination ports, with each bit indicating either the ability or inability of the destination port to receive data.

5. The buffer control apparatus according to claim 1, wherein each deferred header queue entry comprises header information for a data frame and a starting address in the buffer memory for the data frame.

6. The buffer control apparatus according to claim 3, wherein each backup header queue entry comprises header information for a data frame and a starting address in the buffer memory for the data frame.

7. A deferred queue device for temporarily deferring transmission of packets/frames to a destination port in a buffered switch, comprising:
   a deferred header queue device for storing frame information for packets/frames being deferred, the deferred header queue device containing information for packets/frames addressed to more than one destination port;
   means for periodically determining current status of all destination ports in the buffered switch; and
   header select logic unit for determining state of the deferred queue device and supplying a valid buffer address for a deferred packet/frame which can now be sent to an available destination port.

8. The deferred queue device according to claim 7, wherein the deferred queue device further comprises a state engine that can be in one of an Initial State, a Deferred State, and a Backup State.

9. The deferred queue device according to claim 7, further comprising: a backup header queue device for storing frame information for packets/frames waiting to be sent to at least one destination port because the packets/frames arrived at an input port while deferred packets/frames were being sent to the at least one destination port.

10. The deferred queue device according to claim 7, further comprising: a backup header queue device that operates in parallel with the deferred header queue device for storing frame information for packets/frames waiting to be sent to at least one destination port.

11. The deferred queue device according to claim 7, wherein an XOFF mask is used to determine the current status of all destination ports in the buffered switch, the XOFF mask being a memory device having a bit associated with each possible destination ports, with each bit indicating either the ability or inability of the destination ports to receive data.

12. The deferred queue device according to claim 7, wherein the stored frame information comprises frame header information and a starting address in the buffer memory for the packet/frame.

13. The deferred queue device according to claim 9, wherein the stored frame information comprises frame header information and a starting address in the buffer memory for the packet/frame.

14. A method for temporarily deferring transmission of data to a destination port in a buffered switch, comprising the steps of:
   a. during an initial state:
      i. receiving a request for transmission of data to the destination port;
      ii. determining whether the destination port is available to receive the data;
      iii. deferring transmission of the data when the determining step determines that the destination port is not available to receive the data by storing entries including destinations for the data to be deferred in a deferred header queue simultaneously containing entries corresponding to data addressed to different destination ports;
      iv. transmitting data to the destination port when the determining step determines the destination port is available to receive the data; and
      v. repeating the above steps i–iv for all data to be transmitted;

b. upon receiving notification that a destination port has changed state and may now receive data, entering into a deferred state during which:
   i. all entries in the deferred header queue are analyzed in the order in which the entries were added to the deferred header queue;
   ii. upon determining that the destination port for an entry in the deferred header queue is now able to receive data, transmitting the corresponding deferred data to the destination port;
   iii. upon determining the destination port for an entry in the deferred header queue is still not able to receive data, ensuring the entry corresponding to the data remains in the deferred header queue; and
   iv. repeating steps i–iii for all entries in the deferred header queue.

15. The method according to claim 14, further comprising the steps of: storing in a backup header queue entries including destinations for data received during the deferred state; and further comprising the steps of:
   c. upon completing step b, entering a backup state whenever there is data having at least one entry in the backup header queue by performing the steps of:
      i. periodically checking to determine if the destination ports for data having entries in the backup header queue are available;
      ii. transmitting the data to the destination ports when it is determined that the destination ports are available;
      iii. placing entries including destinations for the data into the deferred header queue when it is determined that the destination ports are not available.

16. The method according to claim 15, wherein the data is transmitted to the destination port in the order in which entries for the data were received at the backup header queue for the destination port.

17. The method of claim 14, wherein entries in the deferred header queue further include a buffer address location indicating where the data resides in a buffer memory.

18. A data switch having a plurality of output ports, each output port having a positive or negative transmission status; the switch comprising:
   a. an input buffer receiving a plurality of data frames each associated with an output port;
   b. a mechanism at each input buffer to determine the transmission status of the output port;
   c. a deferred header queue in which destination entries for data for a plurality of different output ports having a negative transmission status are tracked;
   d. a backup header queue in which destination entries for newly received data are queued when destination entries in the deferred header queue are being processed; and
   e. a state machine that enters a deferred state when an output port moves from a negative to a positive transmission status, the deferred state causing the data switch:
      i. to process destination entries in the deferred header queue so as to transmit to the associated output port that data which is addressed to an output port that now has a positive transmission status,
      ii. to ensure that destination entries in the deferred header queue addressed to output ports that still have a negative transmission status remain in the deferred header queue, and
      iii. to place destination entries for newly received data in the backup header queue.

19. The data switch of claim 18, wherein the state machine enters a backup state when all destination entries in the deferred header queue are processed in the deferred state and destination entries exists in the backup header queue, the backup state causing the data switch to determine whether the data corresponding to destination entries in the backup header queue should be transmitted to its associated output ports or the destination entries should be stored in the deferred header queue based upon the transmission status of the data's associated output port.

20. The data switch of claim 19, wherein the state machine moves from the backup state to the deferred state when an output port moves from the negative transmission state to the positive transmission status.

21. The data switch of claim 20, wherein the state machine enters a normal state when the deferred state is completed and no destination entries exist in the backup header queue, or when the backup state is completed and no port has moved from the negative transmission state to the positive transmission state, and wherein the normal state causes the data switch to determine whether incoming data should be transmitted to the associated output port or destination entries corresponding to the incoming data be queued on the deferred queue depending on the transmission status of the associated output port.

22. The data switch of claim 18, wherein the mechanisms to determine the transmission status of the output ports is an XOFF mask.

23. The data switch of claim 22, wherein the XOFF mask comprises a memory device having a bit associated with every output port, with each bit indicating either the ability or inability of the output port to receive data at a current time.

24. The data switch of claim 22, wherein the XOFF mask is updated in real time except during the deferred state, during which time changes to the XOFF mask indicating a change of a port transmission status from negative to positive are delayed until all destination entries in the deferred queue have been analyzed.

25. The data switch of claim 24, wherein the deferred state is reentered with an updated XOFF mask after all destination entries in the deferred queue are analyzed with an original XOFF mask if the change of a port transmission status from negative to positive occurs during the deferred state.

26. The data switch of claim 18, wherein the data frames are selected from a group of frames comprising fixed length frames and packets, frames and packets having end of frame delimiters, and variable length data frames and packets.

27. A data switch having a plurality of destination ports comprising:
   a deferred header queue that stores destination entries for data being deferred, the deferred header queue containing entries for data addressed to more than one destination port; and
   a logic unit having an initial state and a deferred state,
      in the initial state the logic unit transmits data to non-blocked destination ports and adds destination entries for data to the deferred header queue where that data is addressed to a blocked destination port, and
      in the deferred state the logic unit processes destination entries in the deferred header queue by transmitting to its destination port the corresponding deferred data that is addressed to a no longer blocked destination port, and by retaining within the deferred header queue destination entries for data that are addressed to still-blocked destination ports.

* * * * *